(12) United States Patent
Nozoe et al.

(10) Patent No.: US 7,390,864 B2
(45) Date of Patent: Jun. 24, 2008

(54) NORBORNENE-BASED POLYMER, FILM, POLARIZING PLATE AND LIQUID CRYSTAL DISPLAY DEVICE

(75) Inventors: Yutaka Nozoe, Minami-Ashigara (JP); Saisuke Watanabe, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 0 days.

(21) Appl. No.: 11/862,322

(22) Filed: Sep. 27, 2007

(65) Prior Publication Data

US 2008/0081890 A1 Apr. 3, 2008

(30) Foreign Application Priority Data

Sep. 28, 2006 (JP) .............................. 2006-265002

(51) Int. Cl.
C08F 32/08 (2006.01)
C09K 19/52 (2006.01)
C07C 13/42 (2006.01)

(52) U.S. Cl. .................... 526/281; 585/22; 428/1.1; 428/1.31; 359/500; 349/96

(58) Field of Classification Search ............... 526/281; 585/22; 428/1.1, 1.31; 359/500; 349/96
See application file for complete search history.

(56) References Cited

U.S. PATENT DOCUMENTS 6,599,677 B2 * 7/2003 Szmanda et al. ......... 430/270.1

2007/0065747 A1 * 3/2007 Miyamoto et al. ....... 430/270.1

FOREIGN PATENT DOCUMENTS

| JP | 11-133408 A | 5/1999 |
| JP | 2005-036201 A | 2/2005 |
| WO | WO 2004/049011 A2 | 6/2004 |

* cited by examiner

*Primary Examiner*—Fred M Teskin
(74) *Attorney, Agent, or Firm*—Buchanan Ingersoll & Rooney PC

(57) ABSTRACT

A norbornene-based polymer, which is formed by addition polymerization of a composition comprising at least one norbornene derivative represented by formula (1):

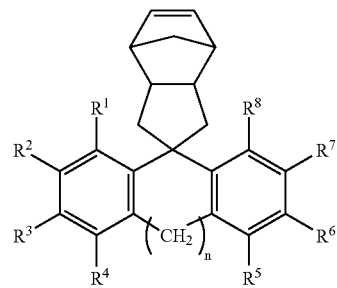

Formula (1)

wherein $R^1$, $R^2$, $R^3$, $R^4$, $R^5$, $R^6$, $R^7$ and $R^8$ each independently represents a hydrogen atom or a substituent; and n represents an integer of 0 to 2.

10 Claims, No Drawings

NORBORNENE-BASED POLYMER, FILM, POLARIZING PLATE AND LIQUID CRYSTAL DISPLAY DEVICE

BACKGROUND OF THE INVENTION

1. Field of the Invention

The present invention relates to a norbornene-based polymer, a film (particularly, a retardation film, a viewing angle-enlarging film, various functional films such as an antireflection film for use in plasma displays, a protective film for polarizing plates) using the same, a polarizing plate, and a liquid crystal display device.

2. Description of the Related Art

Hitherto, since a film using a norbornene-based polymer obtainable by vinyl polymerization of a norbornene-based compound has a characteristic that retardation in a thickness-direction (Rth) is high, the film has been applied to a negative C plate (WO2004/049011). Furthermore, by stretching it, the main chain of the norbornene-based polymer is aligned in a stretching direction and thereby retardation (Re) is exhibited, so that the polymer can be applied to a negative biaxial retardation plate. Namely, a film of the conventional norbornene-based polymer is promising as a retardation film having high Re and Rth.

On the other hand, as displaying modes of liquid crystal televisions have been diversified, necessary retardation films have been also diversified. As one of such films, a retardation film having small Rth or negative Rth has been desired. For example, in so-called in-plane switching (IPS) mode wherein a transverse electric field is applied to liquid crystals, as one means for improving a color tone and a viewing angle at display of black color, it has been proposed to align an optically-compensatory material having a birefringent property as an optically-compensatory film between a liquid crystal layer and a polarizing plate, the material being obtained by combining a film having a positive birefringence and an optical axis in the film plane and a film having a positive birefringence and an optical axis in a normal line direction of the film (JP-A-11-133408).

For the above request, there has been proposed a ring-opened (co)polymer wherein birefringence is substantially not generated, which is obtained by ring-opening (co)polymerization of a norbornene-based monomer which imparts "negative birefringence" to the polymer (JP-A-2005-36201). However, since the negative birefringence is exhibited by monoaxial stretching of the film, it is considered that independent control of Re and Rth is difficult, so that it is highly desired to develop a film of a norbornene-based polymer, which allows only Rth to be small or negative without affecting Re.

SUMMARY OF THE INVENTION

An object of the invention is to provide a norbornene-based polymer capable of being used in the production of a film having small Rth or negative Rth. Furthermore, it is to provide a film using the norbornene-based polymer as well as a polarizing plate and a liquid crystal display device using the film.

Means for solving the above problems are as follows.

[1] A norbornene-based polymer, which is formed by addition polymerization of a composition comprising at least one norbornene derivative represented by formula (1):

Formula (1)

wherein $R^1$, $R^2$, $R^3$, $R^4$, $R^5$, $R^6$, $R^7$ and $R^8$ each independently represents a hydrogen atom or a substituent; and n represents an integer of 0 to 2.

[2] The norbornene-based polymer as described in [1] above, wherein the composition further comprises at least one norbornene derivative represented by formula (2):

Formula (2)

wherein $R^9$, $R^{10}$, $R^{11}$ and $R^{12}$ each independently represents a hydrogen atom or a substituent.

[3] The norbornene-based polymer as described in [2] above, wherein at least one of $R^9$, $R^{10}$, $R^{11}$ and $R^{12}$ in formula (2) is a substituent represented by formula (3):

Formula (3)

*—L—O—C(=O)—$R^{13}$ wherein $R^{13}$ represents a substituted or unsubstituted aliphatic group; and L represents a single bond or an unsubstituted aliphatic group.

[4] The norbornene-based polymer as described in any of [1] to [3] above, wherein n represents an integer of 0 to 1.

[5] The norbornene-based polymer as described in any of [1] to [4] above, wherein n represents 0.

[6] The norbornene-based polymer as described in [3] above, wherein $R^{13}$ represents an unsubstituted aliphatic group.

[7] The norbornene-based polymer as described in [3] or [6] above, wherein L represents an unsubstituted aliphatic group.

[8] A film, which comprises the norbornene-based polymer as described in any of [1] to [7] above.

[9] A polarizing plate, which comprises the film as described in [8] above.

[10] A liquid crystal display device, which comprises at least one of the film as described in [8] above and a polarizing plate comprising the film as described in [8] above.

DETAILED DESCRIPTION OF THE INVENTION

The following will describe modes for carrying out the invention in detail. Herein, the "to" as used for expressing a numeric range is used so that numeric values described before and after it mean a lower limit and an upper limit, respectively.

[Norbornene-Based Polymer]

The norbornene-based polymer of the invention is a polymer formed by addition polymerization of a monomer composition containing at least one norbornene derivative represented by the following formula (1).

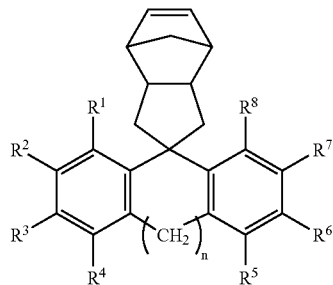

Formula (1)

$R^1$, $R^2$, $R^3$, $R^4$, $R^5$, $R^6$, $R^7$, and $R^8$ in the formula (1) each independently represents a hydrogen atom or a substituent. As specific examples of the substituent, the following substituent T may be mentioned. Of the substituent T, preferred is an alkyl group, an alkoxy group, an aryloxy group, an acyl group, an acylamino group, an acyloxy group, or a halogen group, more preferred is an alkyl group, an alkoxy group, an acyloxy group, or a halogen group, and most preferred is an alkoxy group or a halogen group. n represents an integer of 0 to 2, and preferred is 0 to 1 and more preferred is 0. These substituents may be further substituted. Moreover, in the case where two or more substituents are present, they may be the same or different from each other. Furthermore, if possible, they may be combined with each other to form a ring.

Preferred is a copolymer formed by addition polymerization of a monomer composition wherein the above monomer composition further contains at least one norbornene derivative represented by the following formula (2):

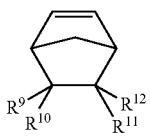

Formula (2)

$R^9$, $R^{10}$, $R^{11}$, and $R^{12}$ in the formula (2) each independently represents a hydrogen atom or a substituent. As the substituent, at least one of $R^9$, $R^{10}$, $R^{11}$, and $R^{12}$ is particularly preferably a substituent represented by the following formula (3). The number of the substituent represented by the formula (3) is not particularly limited but mono-substitution or di-substitution is preferred and mono-substitution is particularly preferred. Other than the substituent represented by the following formula (3), a hydrogen atom or a substituted or unsubstituted aliphatic group is preferred, a hydrogen atom or an unsubstituted aliphatic group is more preferred, and a hydrogen atom is further preferred.

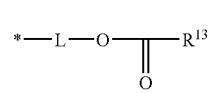

Formula (3)

In the formula (3), $R^{13}$ represents a substituted or unsubstituted aliphatic group and an unsubstituted aliphatic group is more preferred. L represents a single bond or an unsubstituted aliphatic group and an unsubstituted aliphatic group is more preferred.

The following will describe the substituted or unsubstituted aliphatic group in $R^9$, $R^{10}$, $R^{11}$, $R^{12}$, and $R^{13}$.

The aliphatic group in $R^9$, $R^{10}$, $R^{11}$, $R^{12}$, and $R^{13}$ may be linear, branched, or cyclic but is particularly preferably linear. The aliphatic group has a carbon number of preferably 1 to 16, more preferably 1 to 12, and particularly preferably 1 to 8.

Examples of the aliphatic group include a methyl group, an ethyl group, an n-propyl group, an isopropyl group, a cyclopropyl group, an n-butyl group, an isobutyl group, a sec-butyl group, a tert-butyl group, an amyl group, an isoamyl group, a tert-amyl group, an n-hexyl group, a cyclohexyl group, an n-heptyl group, an n-octyl group, a bicyclooctyl group, an adamantyl group, an n-decyl group, a tert-octyl group, a decyl group, a hexadecyl group, and the like.

As the substituent of the aliphatic group, an alkyl group, an alkoxy group, an acyl group, and an acyloxy group may be mentioned and an alkyl group or an alkoxy group is preferred.

Examples of the unsubstituted aliphatic group in L include a methylene group, an ethylene group, a propylene group, a butylene group, and the like. Particularly, a methylene group is preferred.

Moreover, the following will describe the above substituent T in detail.

Examples of the substituent T include alkyl groups having a carbon number of preferably 1 to 20, more preferably 1 to 12, particularly preferably 1 to 8, such as a methyl group, an ethyl group, an isopropyl group, a tert-butyl group, an n-octyl group, an n-decyl group, an n-hexadecyl group, a cyclopropyl group, a cyclopentyl group, and a cyclohexyl group; alkenyl groups having a carbon number of preferably 2 to 20, more preferably 2 to 12, particularly preferably 2 to 8, such as a vinyl group, an allyl group, a 2-butenyl group, and a 3-pentenyl group; alkynyl groups having a carbon number of preferably 2 to 20, more preferably 2 to 12, particularly preferably 2 to 8, such as a propargyl group and a 3-pentynyl group; aryl groups having a carbon number of preferably 6 to 30, more preferably 6 to 20, particularly preferably 6 to 12, such as a phenyl group, a biphenyl group, and a naphthyl group; substituted or unsubstituted amino groups having a carbon number of preferably 0 to 20, more preferably 0 to 10, particularly preferably 0 to 6, such as an amino group, a methylamino group, a dimethylamino group, a diethylamino group, and a dibenzylamino group;

alkoxy groups having a carbon number of preferably 1 to 20, more preferably 1 to 12, particularly preferably 1 to 8, such as a methoxy group, an ethoxy group, and a butoxy group; aryloxy groups having a carbon number of preferably 6 to 20, more preferably 6 to 16, particularly preferably 6 to 12, such as a phenyloxy group and a 2-naphthyloxy group; acyl groups having a carbon number of preferably 1 to 20, more preferably 1 to 16, particularly preferably 1 to 12, such as an acetyl group, a benzoyl group, a formyl group, and a pivaloyl group; alkoxycarbonyl groups having a carbon number of preferably 2 to 20, more preferably 2 to 16, particularly preferably 2 to 12, such as a methoxycarbonyl group and an ethoxycarbonyl group; aryloxycarbonyl groups having a carbon number of preferably 7 to 20, more preferably 7 to 16, particularly preferably 7 to 10, such as a phenyloxycarbonyl group; acyloxy groups having a carbon number of preferably 2 to 20, more preferably 2 to 16, particularly preferably 2 to 10, such as an acetoxy group and a benzoyloxy group;

acylamino groups having a carbon number of preferably 2 to 20, more preferably 2 to 16, particularly preferably 2 to 10, such as an acetylamino group and a benzoylamino group; alkoxycarbonylamino groups having a carbon number of preferably 2 to 20, more preferably 2 to 16, particularly preferably 2 to 12, such as a methoxycarbonylamino group; aryloxycarbonylamino groups having a carbon number of preferably 7 to 20, more preferably 7 to 16, particularly preferably 7 to 12, such as a phenyloxycarbonylamino group; sulfonylamino groups having a carbon number of preferably 1 to 20, more preferably 1 to 16, particularly preferably 1 to 12, such as a methanesulfonylamino group and a benzenesulfonylamino group; sulfamoyl groups having a carbon number of preferably 0 to 20, more preferably 0 to 16, particularly preferably 0 to 12, such as a sulfamoyl group, a methylsulfamoyl group, a dimethylsulfamoyl group, and a phenylsulfamoyl group; carbamoyl groups having a carbon number of preferably 1 to 20, more preferably 1 to 16, particularly preferably 1 to 12, such as a carbamoyl group, a methylcarbamoyl, a diethylcarbamoyl group, and a phenylcarbamoyl group;

alkylthio groups having a carbon number of preferably 1 to 20, more preferably 1 to 16, particularly preferably 1 to 12, such as a methylthio group and an ethylthio group; arylthio groups having a carbon number of preferably 6 to 20, more preferably 6 to 16, particularly preferably 6 to 12, such as a phenylthio group; sulfonyl groups having a carbon number of preferably 1 to 20, more preferably 1 to 16, particularly preferably 1 to 12, such as a mesyl group and a tosyl group; sulfinyl groups having a carbon number of preferably 1 to 20, more preferably 1 to 16, particularly preferably 1 to 12, such as a methanesulfinyl group and a benzenesulfinyl group; ureido groups having a carbon number of preferably 1 to 20, more preferably 1 to 16, particularly preferably 1 to 12, such as a ureido group, a methylureido group, and a pheylureido group; phosphoramido groups having a carbon number of preferably 1 to 20, more preferably 1 to 16, particularly preferably 1 to 12, such as diethylphosphoramide and phenylphosphoramide; a hydroxy group; a mercapto group; halogen atoms such as a fluorine atom, a chlorine atom, a bromine atom, and an iodine atom; a cyano group; a sulfo group; a carboxyl group; a nitro group; a hydroxamic acid group, a sulfino group; a hydrazino group; an imino group; heterocyclic groups having a carbon number of preferably 1 to 30, more preferably 1 to 12 and containing, for example, a nitrogen atom, an oxygen atom, or a sulfur atom as a hetero atom, specifically such as an imidazolyl group, a pyridyl group, a quinolyl group, a furyl group, a piperidyl group, a morpholino group, a benzoxazolyl group, a benzimidazolyl group, and a benzothiazolyl group; silyl groups having a carbon number of preferably 3 to 40, more preferably 3 to 30, particularly preferably 3 to 24, such as a trimethylsilyl group and a triphenylsilyl group; and the like.

These substituents may be further substituted. Moreover, in the case where two or more substituents are present, they may be the same or different from each other. Furthermore, if possible, they may be combined with each other to form a ring.

In the copolymer formed by addition polymerization of a monomer composition containing at least one norbornene derivative represented by the above formula (1), the molar content of the norbornene derivative represented by the above formula (1) is preferably 2% to 100%, more preferably 5% to 70%, further preferably 5% to 50%.

Moreover, in the copolymer formed by addition polymerization of the monomer composition further containing at least one norbornene derivative represented by the above formula (2), the molar content of the norbornene derivative represented by the above formula (2) is preferably 0% to 98%, more preferably 10% to 90%, further preferably 30% to 70%.

Furthermore, in the copolymer containing at least one norbornene derivative represented by the formula (1) and at least one norbornene derivative represented by the formula (2), the molar compositional ratio of the norbornene derivative represented by the formula (1) to the norbornene derivative represented by the formula (2) (the formula (1)/the formula (2)) is preferably 2 to 100%/98 to 0%, more preferably 5 to 70%/95 to 30%, most preferably 5 to 50%/95 to 50%.

By controlling the compositional ratio of the norbornene derivative represented by the formula (1) to the norbornene derivative represented by the formula (2), the value of Rth can be regulated to a preferred value with hardly affecting Re.

The norbornene-based polymer of the invention may contain the other component(s) in the range without deviating from the gist of the invention. For example, the polymer may contain reaction residues such as monomers constituting the polymer and additives usually used in the polymerization.

The norbornene-based polymer of the invention has a number-average molecular weight (Mn) in terms of polystyrene measured by gel permeation chromatography using tetrahydrofuran as a solvent of preferably 10,000 to 1,000,000, more preferably 50,000 to 500,000. Moreover, the weight-average molecular weight (Mw) in terms of polystyrene is preferably 15,000 to 1,500,000, more preferably 70,000 to 700,000. By controlling the number-average molecular weight in terms of polystyrene to 10,000 or more or controlling the weight-average molecular weight to 15,000 or more, breaking strength is sometimes insufficient. By controlling the number-average molecular weight in terms of polystyrene to 1,000,000 or less or controlling the weight-average molecular weight to 1,500,000 or less, molding ability as a sheet is improved, solution viscosity tends to decrease at the time when the polymer is formed into a cast film or the like, and handling tends to be easy, so that the case is preferred. The molecular weight distribution (the weight-average molecular weight/the number-average molecular weight) is preferably 1.1 to 5.0, more preferably 1.1 to 4.0, and further preferably 1.1 to 3.5. By controlling the molecular weight distribution of the norbornene-based polymer to 5.0 or less, the norbornene-based polymer solution (dope) is apt to be homogeneous and a good film is easily prepared.

The norbornene-based polymer of the invention can be obtained by the following production method.

The polymer can be obtained by homopolymerization or copolymerization of monomer(s) at a reaction temperature ranging from 20 to 150° C. in a solvent using a cationic complex of Ni, Pd, Co, or the like of Group 8 of the periodic table or a catalyst forming a cationic complex, such as [Pd(CH$_3$CN)$_4$][BF$_4$]$_2$, di-µ-chloro-bis-(6-methoxybicyclo[2.2.1]hept-2-ene-endo-5σ,2π)-Pd (hereinafter abbreviated as "I") and methylalumoxane (MAO), I and AgBF$_4$, I and AgSbF$_6$, [(η$^3$-allyl)PdCl]$_2$ and AgSbF$_6$, [(η$^3$-allyl)PdCl]$_2$ and AgBF$_4$, [(η$^3$-crotyl)Pd(cyclooctadiene)][PF$_6$], [(η$^3$-allyl)Pd (η$^5$-cyclopentadienyl)]$_2$ and tricyclohexylphosphine and dimethylanilinium tetrakispentafluorophenyl borate or trityl tetrakispentafluorophenyl borate, palladium bisacetylacetonate and tricyclophosphine and dimethylanilinium tetrakispentafluorophenyl borate, [(η3-allyl) PdCl]$_2$ and tricyclohexylphosphine and tributylallytin or allylmagnesium chloride and dimethylanilinium tetrakispentafluorophenyl borate, bis(2,4-pentanedionato)palladium and tricyclophosphine and dimethylanilinium tetrakispentafluorophenyl borate, [(η$^5$-cyclopentadienyl)Ni(methyl)(triphenylphosphine)] and trispentafluorophenylborane, [(η$^3$-crotyl)Ni(cyclooctadiene)][B((CF$_3$)$_2$C$_6$H$_4$)$_4$], [NiBr(NPMe$_3$)]$_4$ and MAO, Ni(octoate)$_2$ and MAO, Ni(octoate)$_2$ and B(C$_6$F$_5$)$_3$ and AlEt$_3$, Ni(octoate)$_2$ and [Ph$_3$C][B(C$_6$F$_5$)$_4$] and Ali-Bu$_3$, or Co(neodecanoate) and MAO.

Furthermore, the norbornene derivative represented by the formula (2) for use in the invention is generally obtained by Diels-Alder reaction of a corresponding olefin and cyclopentadiene obtained by thermolysis of dicyclopentadiene. Homopolymers or copolymers can be obtained by subjecting them to the aforementioned polymerization method.

The compositional ratio (x and 100-x) of the monomer unit represented by the formula (1) to the monomer unit represented by the formula (2) in the copolymer can be regulated by suitably changing their mixing ratio. Incidentally, the norbornene derivative (1) may be copolymerized with two or more of the other norbornene derivatives.

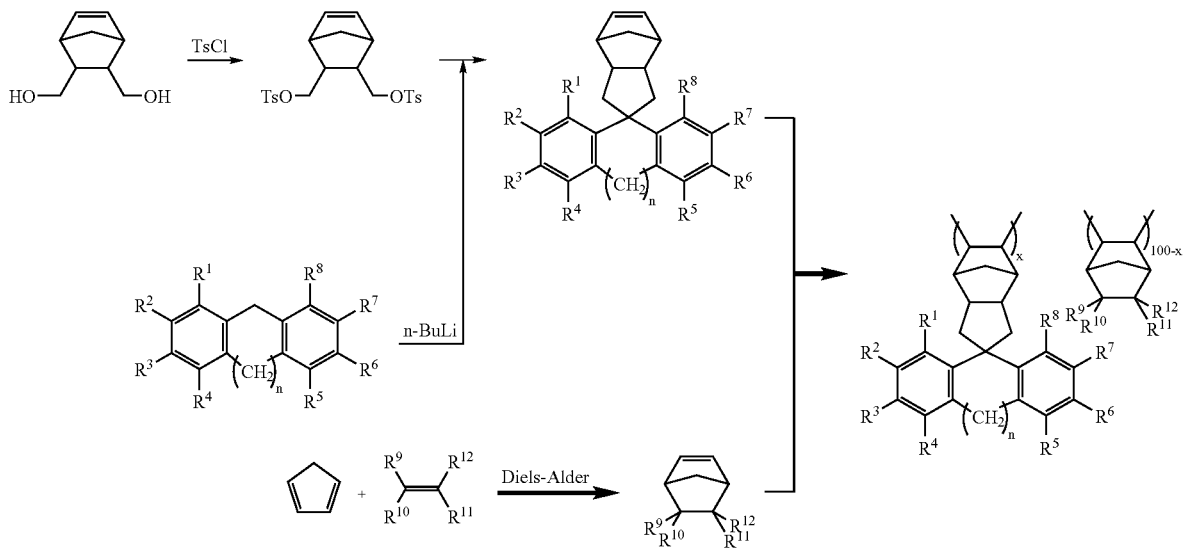

The amount of the above catalyst to be used is not particularly limited but the molar content relative to the monomer(s) is preferably 1/100 to 1/1,000,000, more preferably 1/100 to 1/10,000, most preferably 1/500 to 1/10,000.

The solvent can be selected from alicyclic hydrocarbon solvents such as cyclohexane, cyclopentane, and methylcyclopentane; aliphatic hydrocarbon solvents such as pentane, hexane, heptane, and octane; aromatic hydrocarbon solvents such as toluene, benzene, and xylene; halogenated hydrocarbon solvents such as dichloromethane, 1,2-dichloroethylene, and chlorobenzene; polar solvents such as ethyl acetate, butyl acetate, γ-butyrolactone, propylene glycol dimethyl ether, and nitromethane.

In addition, as the other polymerization methods, there may be suitably used methods described in Macromolecules, 1996, vol. 29, p. 2755; Macromolecules, 2002, vol. 35, p. 8969; WO2004/7564.

Moreover, as the norbornene derivative of the invention represented by the formula (1), there may be, for example, mentioned spiro compounds and the like obtained by modifying norbornenedimethanol with an appropriate eliminating group (a tosyl group, a halogen atom, etc.), followed by a reaction with a fluorene anion. Norbornenedimethanol is present as two isomers of an endo-form and an exo-form and each of them is commercially available from Aldrich Co., Ltd. and the like, so that the norbornene derivative of the invention can be separately produced as two isomers of the endo-form and the exo-form.

The following will show preferable examples of the compounds represented by the formulae (1) to (3) but the invention is not limited to these specific examples.

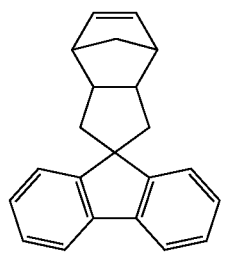

A-1

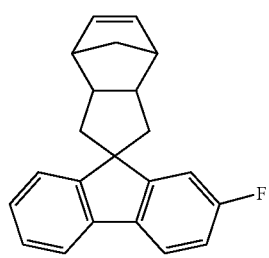

A-2

-continued
A-3
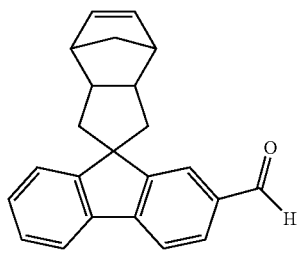
A-4
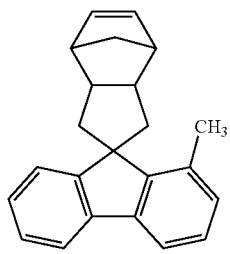
A-5
A-6
A-7
A-8
-continued
A-9
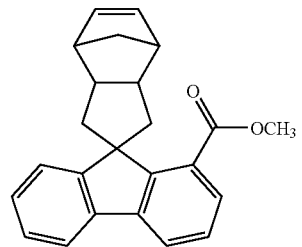
A-10
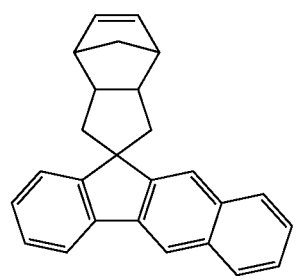
A-11
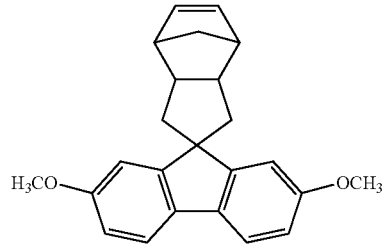
A-12
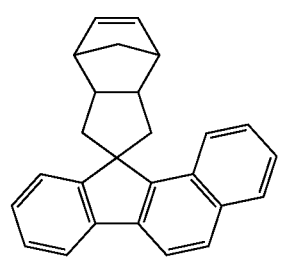
A-13
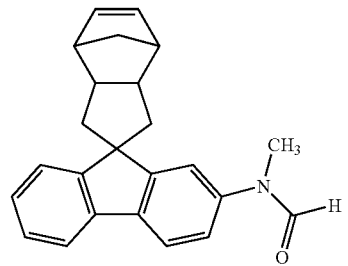
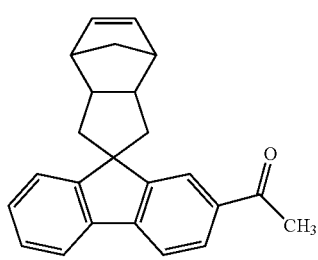

-continued
A-14 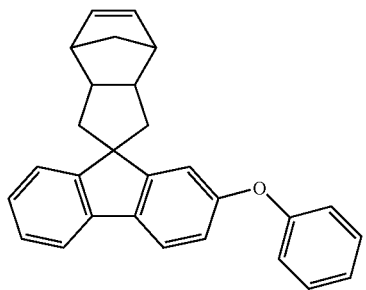
A-15 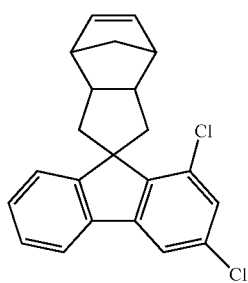
A-16 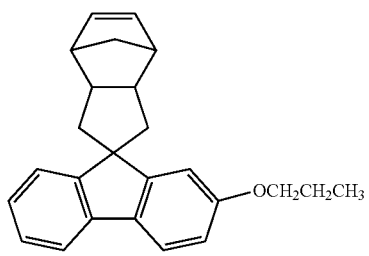
A-17 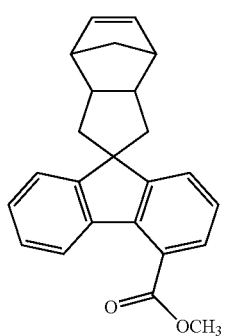
A-18 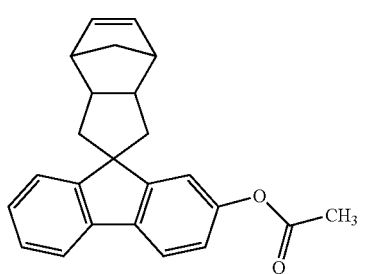
-continued
A-19 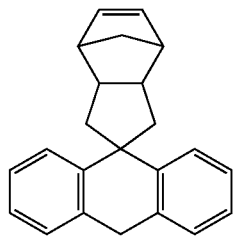
A-20 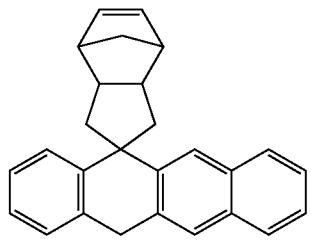
B-1 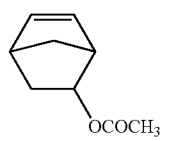
B-2 
B-3 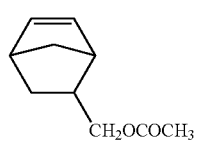
B-4 
B-5 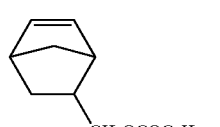
B-6 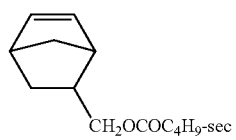

-continued

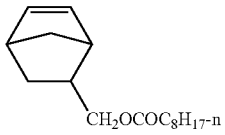
B-7

—OCOCH₃    C-1

—OCOC₃H₇-n    C-2

—CH₂OCOCH₃    C-3

—CH₂OCOC₃H₇-n    C-4

—CH₂OCOC₄H₉-sec    C-5

—CH₂OCOC₅H₁₁-n    C-6

—CH₂OCOC₈H₁₇-n    C-7

[Norbornene-based Polymer Film]

The norbornene-based polymer of the invention is useful as a material of films. Particularly, a film prepared using the polymer is suitably used as a film for optical uses including a substrate of liquid crystal display devices, an optical waveguide, a polarizing film, a retardation film, a liquid crystal backlight, a liquid crystal panel, an OHP film, a transparent conductive film, or the like. In addition, the norbornene-based polymer represented by the above formula (1) is suitably used for optical materials such as optical disks, optical fibers, lenses, and prisms, and electronic parts as well as medical equipments, vessels, and the like.

[Production Method of Norbornene-based Polymer]

The film of the invention comprises a norbornene-based polymer containing a monomer unit represented by the above formula (1) and can be prepared by film formation using the polymer as a raw material. The film formation includes a method of heat melt film formation wherein the polymer is melted to form a film and a method of solution film formation wherein the polymer is dissolved in a solvent to form a film and either method can be applicable but, in the invention, use of the method of solution film formation is preferred. The following will describe the method of solution film formation.

<Method of Solution Film Formation>

(Preparation of Dope)

First, a solution of the above polymer (dope) for use in film formation is prepared. The solvent for use in the preparation of the dope is not particularly limited so long as it can be used for dissolution, casting, and film formation and the purpose can be achieved. For example, preferred is an organic solvent selected from chlorinated solvents represented by dichloromethane and chloroform; linear hydrocarbons each having 3 to 12 carbon atoms, such as hexane, octane, isooctane, and decane; cyclic hydrocarbons such as cyclopentane, cyclohexane, and decaline; aromatic hydrocarbons such as benzene, toluene, and xylene; esters such as ethyl formate, propyl formate, pentyl formate, methyl acetate, ethyl acetate, and pentyl acetate; ketones such as acetone, methyl ethyl ketone, diethyl ketone, diisobutyl ketone, cyclopentanone, cyclohexanone, and methylcyclohexanone; ethers such as diisopropyl ether, dimethoxymethane, dimethoxyethane, 1,4-dioxane, 1,3-dioxolane, tetrahydrofuran, anisole, and phenetole. Examples of the organic solvent having two or more functional groups may include 2-ethoxyethyl acetate, 2-methoxyethanol, and 2-butoxyethanol. Preferred boiling point of the organic solvent is 35° C. to 200° C. As the solvent for use in the preparation of the above solution, in order to control physical properties of the solution, such as drying ability and viscosity, two or more solvent may be mixed and used and furthermore a poor solvent may be added so long as it is soluble as a mixed solvent.

A preferred poor solvent can be suitably selected. In the case where a chlorinated organic solvent is used as a good solvent, alcohols can be suitably used. The alcohols may be linear, branched, or cyclic. Of these, the hydrocarbon parts are preferably saturated aliphatic hydrocarbons. Alcohols may have any of primary to tertiary hydroxyl groups. Incidentally, as alcohols, fluorine type alcohols are also used. Examples thereof may include 2-fluoroethanol, 2,2,2-trifluoroethanol, and 2,2,3,3-tetrafluoro-1-propanol. Of the poor solvents, in particular, monohydric alcohols have a releasing resistance-reducing effect and hence can be preferably used. Depending on the good solvent used, particularly preferred alcohols may vary. When drying load is considered, alcohols each having a boiling point of 120° C. or lower are preferred, monohydric alcohols having 1 to 6 carbon atoms are more preferred, and alcohols having 1 to 4 carbon atoms are particularly preferably used.

Particularly preferred mixed solvents at the preparation of the dope are combinations wherein dichloromethane is used as a main solvent and one or more alcohols selected from methanol, ethanol, propanol, isopropanol, and butanol are used as poor solvents.

For the preparation of the above dope, there may be mentioned a method of dissolution under stirring at room temperature, a method of dissolution under cooling wherein the polymer is swelled by stirring at room temperature and then the whole was cooled to −20° C. to −100° C. and again heated to 20° C. to 100° C. to dissolve the polymer, a method of dissolution at a high temperature wherein the dissolution is conducted at a temperature equal to or higher than the boiling point of the main solvent in a tightly closed vessel, and a method of dissolving the polymer by elevating temperature and pressure to the critical point of the solvent. The viscosity of the dope at 25° C. is preferably in the range of 1 to 500 Pa·s, more preferably in the range of 5 to 200 Pa·s. The measurement of the viscosity is conducted as follows. 1 mL of a sample solution is set on a rheometer (CLS 500 manufactured by TA Instruments Co.) using a Steel Cone (manufactured by TA Instruments Co.) having a diameter of 4-cm/2° and the sample solution was kept constant at a measurement starting temperature beforehand. Then, the measurement is started.

The solution is preferably subjected to filtration to remove foreign matters such as undissolved matters, dust, and impurities by the use of an appropriate filter of metal gauze, flannel, or the like prior to casting. The viscosity immediately before film formation may be in such a range as to allow casting for film formation. It is preferred to prepare the solution to have viscosity in the range of preferably 5 Pa·s to 1000 Pa·s, more preferably 15 Pa·S to 500 Pa·S, and further preferably 30 Pa·s to 200 Pa·s. Incidentally, the temperature at this step is not particularly limited so long as it is the temperature at the time of casting but it is preferably −5 to 70° C., more preferably −5 to 35° C.

(Additives)

The film of the invention may contain additives other than the above polymer and such additives may be added at any stage of the process of preparing the film. The additives can be selected according to applications and examples thereof may include a deterioration inhibitor, an ultraviolet absorber, a retardation (optical anisotropy) controlling agent, fine particles, a release accelerator, and the like. These additives may be each either a solid or an oily substance. With regard to the timing of the addition, in the case of film preparation by solution casting, they may be added at any timing in the dope production process or a step of adding the additives for preparation may be incorporated to the final preparation step in the dope production process. In the case of film preparation by the melting method, the additives may be added at the time of resin pellet preparation or may be kneaded at the time of film preparation. The amount of each material to be added is not particularly limited so long as it allows the function to be exhibited. Moreover, when the film formed is in a multilayered structure, the types and the amounts of additives for respective layers may be different from one another.

From the viewpoint of prevention of film deterioration, the deterioration (oxidation) inhibitor is preferably used. For example, phenol-based or hydroquinone-based oxidation inhibitors such as 2,6-di-tert-butyl-4-methylphenol, 4,4'-thiobis-(6-tert-butyl-3-methylphenol), pentaerythrityl-tetrakis[3-(3,5-di-tert-butyl-4-hydroxyphenyl)propionate can be added. Furthermore, it is preferred to use phosphorus-based oxidation inhibitors such as tris(4-methoxy-3,5-diphenyl) phosphite, tris(nonylphenyl) phosphite, and bis(2,4-di-tert-butylphenyl)pentaerythritol diphosphite. The oxidation inhibitors are added in an amount of 0.05 to 5.0 parts by mass based on 100 parts by mass. (In this specification, mass ratio is equal to weight ratio.)

From the viewpoint of deterioration inhibition of the polarizing plate, the liquid crystal, or the like, an ultraviolet absorber is preferably used. As the ultraviolet absorber, preferably used are those which are excellent in absorbability of ultraviolet ray having a wavelength of 370 nm or less and absorbs little visible light having a wavelength of 400 nm or more in view of good liquid crystal displaying ability. Specific examples of the ultraviolet absorber preferably used in the invention include hindered phenol-based compounds, oxybenzophenone-based compounds, benzotriazole-based compounds, salicylic acid ester-based compounds, benzophenone-based compounds, cyano acrylate-based compounds, nickel complex salt-based compounds, and the like. The amount of the ultraviolet absorber to be added is preferably 1 ppm to 1.0% by mass, more preferably 10 to 1000 ppm based on the amount of the norbornene-based polymer.

In order to improve sliding ability of the film surface, fine particles (mat agent) are preferably used. The use thereof imparts unevenness on the film surface, that is, roughness of the film surface is increased (matting), so that blocking between the films can be decreased. The presence of the fine particles in the film or on at least one surface of the film remarkably improves adherence between the polarizer and the film at the processing of the polarizing plate. The mat agent for use in the invention has, for example, an average particle size of 0.05 µm to 0.5 µm, preferably 0.08 µm to 0.3 µm, more preferably 0.1 µm to 0.25 µm in the case of inorganic fine particles. The fine particles are preferably formed of silicon dioxide, silicone, and titanium dioxide as inorganic compounds and preferably formed of fluorocarbon resins, nylon, polypropylene, and chlorinated polyethers as polymer compounds. More preferred is silicon dioxide, and further preferred is silicon dioxide surface-treated with an organic substance.

In order to reduce the release resistance of the film, a release accelerator is preferably used. As preferred release agent, phosphate ester-based surfactants, carboxylic acid or carboxylate-based surfactants, sulfonic acid or sulfonate-based surfactants, sulfate ester-based surfactants are effective. In addition, fluorinated surfactants wherein a part of hydrogen atoms bonded to the hydrocarbon chain of the above surfactant is substituted by fluorine atom(s) are also effective. The amount of the release agent to be added is preferably 0.05 to 5% by mass, more preferably 0.1 to 2% by mass, further preferably 0.1 to 0.5% by mass based on the mass of the norbornene-based polymer.

From the viewpoint of further reducing the optical anisotropy of the film, a retardation regulator (Rth decreasing agent) is preferably used. Examples of the retardation regulator include phosphate esters described in JP-A-2005-89668, sulfonamide compounds described in JP-A-2005-113113 and JP-A-2006-96793, carbonamide compounds described in JP-A-2006-124649.

(Film Production)

As the film producing method and equipment, there are preferably used a solution casting film formation method and a solution casting film formation apparatus the same as those used for the production of a known cellulose triacetate film. The prepared dope from a dissolution apparatus (tank) is once stored in a storage tank and then, the foams contained in the dope are removed for final preparation.

The cellulose acylate film formation technologies described in each publication of JP-A-2000-301555, JP-A-2000-301558, JP-A-7-032391, JP-A-3-193316, JP-A-5-086212, JP-A-62-037113, JP-A-2-276607, JP-A-55-014201, JP-A-2-111511, and JP-A-2-208650 can be preferably adopted in the invention.

(Multilayer Casting)

The dope may be cast as a monolayer solution on a smooth band or drum as a metal support or two or more layers of a plurality of dopes may be cast. In the case of multilayer casting, the thickness of the inner side and the thickness of the outer side are not particularly limited but preferably, the outer side has a thickness of 1 to 50%, more preferably 2 to 30% of the whole thickness.

(Casting)

As the casting methods of the solution, there are a method wherein the prepared dope is evenly extruded from a pressing die onto the metal support; a method by a doctor blade wherein the thickness of the dope once cast on the metal support is controlled by the blade; a method by a reverse roll coater wherein control is carried out by means of a counter-rotating roll, or other methods. However, the method by means of a pressing die is preferred. The temperature of the dope to be used for casting is preferably −10 to 55° C., more preferably 25 to 50° C. In that case, all points of the step may be the same in temperature, or individual points of the step are different in temperature. In the case of different temperature, it is preferred that a desirable temperature can be achieved immediately before casting.

(Drying)

Drying of the dope on the metal support in the production of the cellulose acylate film is generally accomplished by the following methods: a method wherein a hot air is applied from the surface side of the metal support (drum or band), i.e., from the surface of the web on the metal support; a method wherein a hot air is applied from the rear side of the drum or the band; a liquid heat transfer method wherein a temperature-controlled liquid is brought into contact with the rear side of the band or the drum, which is the opposite side from the dope cast side, thereby to heat the drum or the band by heat transfer for controlling the surface temperature; and other methods. However, the rear side liquid heat transfer method is preferred. The surface temperature of the metal support prior to casting may be any temperature so long as it is equal to or less than the boiling point of the solvent used in the dope. However, in order to promote drying or in order to eliminate the fluidity on the metal support, the temperature is preferably set at a temperature lower by 1 to 10° C. than the boiling point of the solvent having the lowest boiling point among the solvents used. Incidentally, this does not apply to the case where the cast dope is released off after cooling without drying.

(Release)

When release resistance (release load) is large at the time when a half-dried film is released from the metal support, the film is irregularly stretched in a direction of film formation to generate an optically anisotropic unevenness. Particularly, in the case where the release load is large, portions where the film is stepwise stretched and portions where it is not stretched are alternately formed and a distribution in retardation occurs. Thus, when the film is mounted on a liquid crystal display device, striated or band-shaped unevenness is observed. In order to avoid such a problem, it is preferred to reduce the release load of the film to 0.25 N or less per 1 cm of film release width. The release load is more preferably 0.2 N/cm or less, further preferably 0.15 N/cm or less, particularly preferably 0.10 N/cm or less. When the release load is 0.2 N/cm or less, no unevenness derived from the release is observed even on a liquid crystal display device where unevenness is apt to appear, so that the case is preferred. As the method of reducing the release load include a method of adding a release agent as mentioned above and a method of selecting a solvent composition to be used. A preferred concentration of residual vaporizable matters at the release is 5 to 60% by mass. More preferred is 10 to 50% by mass and particularly preferred is 20 to 40% by mass. The release at high vaporization is preferred owing to a rapid drying speed and improved productivity. On the other hand, at high vaporization, the strength and elasticity of the film is small and hence the film tends to be broken or stretched since the film does not withstand release force. In addition, the self-maintenance ability of the film after released is poor and hence the film is apt to be deformed, creased, and cracked. Furthermore, the case causes an occurrence of distribution in retardation.

(Stretching)

In the case where the film prepared by the above solution film formation method is further subjected to a stretching treatment, it is preferred to conduct the treatment in a state where the solvent still sufficiently remains in the film immediately after the release. The purposes of the stretching are (1) to obtain a film excellent in planarity without crease and deformation and (2) to decrease retardation in a thickness-direction. When the stretching is conducted for the purpose of (1), it is preferred to conduct the stretching at a relatively high temperature and at a low stretching magnification of 1% to 10%. Particularly preferred is 2 to 5% of stretching. In the case where the stretching is conducted for the purposes of both (1) and (2) or only (2), it is preferred to conduct the stretching at a relatively low temperature and at a stretching magnification of 5 to 100%.

The stretching of the film may be monoaxial stretching only in a longitudinal or transverse direction or may be simultaneous or sequential biaxial stretching but monoaxial stretching is preferred. The birefringence of the retardation film for VA liquid crystal cells and OCB (Optically Compensatory Bend) liquid crystal cells is preferably such that the refractive index in a width direction is larger than the refractive index in a length direction. Therefore, the film is preferably stretched to a greater degree in the width direction.

The film thickness of the film of the invention finally obtained (after drying) varies according to the intended purpose. In general, the thickness is preferably in the range of 20 to 500 μm, more preferably in the range of 30 to 150 μm. Particularly, the film preferably has a thickness of 40 to 110 μm for liquid crystal display devices.

[Film Properties]

Preferred optical properties of the film of the invention vary depending on applications of the film. The following will show preferred ranges of in-plane retardation (Re) and retardation in a thickness-direction (Rth) in individual applications. Incidentally, unless otherwise stated, Re and Rth in the invention are values at 589 nm.

In the case of using the film as a protective film for a polarizing plate: Re is preferably not less than 0 nm to not more than 5 nm, further preferably not less than 0 nm to not more than 3 nm. Rth is preferably not less than 0 nm to not more than 50 nm, further preferably not less than 0 nm to not more than 35 nm, particularly preferably not less than 0 nm to not more than 10 nm.

In the case of using the film as a retardation film: the ranges of Re and Rth vary depending on the kind of the retardation film and diversified needs are present but Rth(589) of the film of the invention is preferably a negative value. More preferred is not less than −400 nm to not more than −20 nm and further preferred is not less than −300 nm to not more than −30 nm.

Also, Re(589) is preferably not less than −200 nm to not more than 0 nm, further preferably not less than −150 nm to not more than 0 nm.

With regard to the film of the invention, desired optical properties can be realized by suitably controlling process conditions such as the copolymerization ratio, the kind and amount of the additives to be added, the stretching magnification, and the residual vaporizable matters at the release.

Herein, Re(λ) and Rth(λ) represent in-plane retardation and retardation in a thickness-direction at a wavelength of λ, respectively. Re(λ) is measured by means of KOBRA 21ADH or WR (manufactured by Oji Scientific Instruments Co., Ltd.) for light having a wavelength of λ nm made incident in a normal line direction of a film.

In the case where the film to be measured is represented by monoaxial or biaxial refractive index ellipsoid, Rth(λ) is calculated by the following method.

Rth(λ) is calculated by means of KOBRA 21ADH or WR based on the retardation values measured, the hypothetical value of the average refractive index, and the inputted film thickness value. The retardation values are measured in a total of 6 directions as follows: the above Re(λ) is measured for light having a wavelength of λ nm made incident from the direction tilted toward one side at a degree which is increased at each measurement by 10 degree until 50 degree from a normal line direction of the film relative to the in-plane slow axis (judged by KOBRA 21ADH or WR) as a tilt axis (rotational axis), an arbitrary in-plane direction of the film being regarded as the rotational axis in the case where the slow axis is absent.

In the above, in the case of a film having a direction where a retardation value becomes zero at a certain tilt angle from a normal line direction relative to the in-plane slow axis as a rotational axis, the retardation value at a tilt angle larger than the above tilt angle is calculated by means of KOBRA 21ADH or WR after the sign is changed to negative.

In this connection, it is also possible to calculate Rth according to the following mathematical expressions (1) and (2) based on the retardation values measured, the hypothetical value of the average refractive index, and the inputted film thickness value. The retardation values are measured from arbitrary two tilted directions relative to the slow axis as a tilt axis (rotational axis), an arbitrary in-plane direction of the film being regarded as the rotational axis in the case where the slow axis is absent.

$$Re(\theta) = \left[ nx - \frac{ny \times nz}{\sqrt{\left\{ ny \sin\left(\sin^{-1}\left(\frac{\sin(-\theta)}{nx}\right)\right)\right\}^2 + \left\{ nz \cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}}$$

The above $Re(\theta)$ represents a retardation value in a direction tilted by an angle $\theta$ from a normal line direction.

nx in the mathematical expression (1) represents a refractive index in a slow axis direction in the plane, ny represents a refractive index in a direction orthogonal to that of nx in the plane, and nz represents a refractive index in a direction orthogonal to those of nx and ny. d represents thickness of the film.

Mathematical Expression (2)

$$Rth = \left(\frac{nx + ny}{2} - nz\right) \times d$$

In the case where the film to be measured cannot be expressed by monoaxial or biaxial refractive index ellipsoid, i.e., is a so-called film having no optic axis, $Rth(\lambda)$ is calculated by the following method.

$Rth(\lambda)$ is calculated by means of KOBRA 21ADH or WR based on the retardation values measured, the hypothetical value of the average refractive index, and the inputted film thickness value. The retardation values are measured in a total of 11 directions as follows: the above $Re(\lambda)$ is measured for light having a wavelength of $\lambda$ nm made incident from the direction tilted at a degree which is increased at each measurement by 10 degree in the range of −50 degree to +50 degree from a normal direction of the film relative to the in-plane slow axis (judged by KOBRA 21ADH or WR) as a tilt axis (rotational axis).

In the above measurement, as the hypothetical values of the average refractive index, the values in POLYMER HANDBOOK, (JOHN WILEY & SONS, INC) and catalogues of various optical films can be used. When the values of the average refractive index are not known, they can be measured by means of an Abbe refractormeter. The values of the average refractive indices of main optical films will be exemplified below: cellulose acylate (1.48), cycloolefin polymer (1.52), polycarbonate (1.59), polymethyl methacrylate (1.49), and polystyrene (1.59). By inputting these hypothetical values of the average refractive index and film thickness, nx, ny, and nz are calculated by means of KOBRA 21ADH or WR. Nz is further calculated from the nx, ny, and nz calculated according to the expression: Nz=(nx−nz)/(nx−ny).

Moreover, in the case of using the film of the invention as a protective film for a polarizing plate, it is preferred that a value of photoelasticity is $0.5 \times 10^{-13}$ to $9.0 \times 10^{-13}$ [cm$^2$/dym] and a value of moisture permeability (converted value in terms of a film thickness of 80 μm) is 180 to 435 [g/cm$^2$24 h]. The value of photoelasticity is more preferably $0.5 \times 10^{-13}$ to $7.0 \times 10^{-13}$ [cm$^2$/dym], further preferably $0.5 \times 10^{-13}$ to $5.0 \times 10^{-13}$ [cm$^2$/dym]. Furthermore, the value of moisture permeability (converted value in terms of a film thickness of 80 μm) is more preferably 180 to 400 [g/cm$^2$24 h], further preferably 180 to 350 [g/cm$^2$24 h]. When the film of the invention has the above properties, decrease in performance by the influence of moisture can be reduced in the case where it is used as a protective film for a polarizing plate.

[Polarizing Plate]

The polarizing plate of the invention includes at least the film of the invention and a polarizer. A polarizing plate generally includes a polarizer and a pair of protective films disposed on the opposite sides thereof. As the protective film(s) on one side or both sides, the film of the invention can be used. As the other protective film, a usual cellulose acylate film or the like may be used. The polarizer includes an iodine type polarizer, a dye type polarizer using a dichroic dye, and a polyene type polarizer. The iodine type polarizer and the dye type polarizer are generally produced by the use of a polyvinyl alcohol-based film.

When the film of the invention is used as a protective film for the polarizing plate, the film is subjected to such a treatment as mentioned below and then the treated surface of the film is bonded to the polarizer by the use of an adhesive. Examples of the adhesive to be used may include polyvinyl alcohol-based adhesives such as polyvinyl alcohol and polyvinyl butyral, vinyl type latexes such as butyl acrylate, and gelatin. The polarizing plate comprises a polarizer and protective films protecting the opposite sides thereof. Further, the polarizing plate may be configured such that a protective film is bonded on one side of the polarizing plate and a separate film is bonded on the opposite side thereof. The protective film and the separate film are used for the purpose of protecting the polarizing plate during the shipment of the polarizing plates, during the product inspection, or the like. In this case, the protective film is bonded for the purpose of protecting the surface of the polarizing plate, and it is used on the side of the polarizing plate opposite to the side to be bonded to the liquid crystal plate. Furthermore, the separate film is used for the purpose of covering the adhesion layer to be bonded to the liquid crystal plate, and it is used on the surface side of the polarizing plate to be bonded to the liquid crystal plate. The film of the invention is preferably bonded to the polarizer so that the transmission axis of the polarizer is in alignment with the slow axis of the film.

(Surface Treatment of Film)

In the invention, the film is preferably subjected to a surface treatment in order to improve the adhesion between the polarizer and the protective film. With regard to the surface treatment, any methods may be utilized so long as they can improve the adhesion. Examples of preferred surface treatments may include a glow discharge treatment, an ultraviolet irradiation treatment, a corona treatment, and a flame treatment. The glow discharge treatment herein referred to may be so-called low temperature plasma caused under a low-pressure gas. In the invention, a plasma treatment under an atmospheric pressure is also preferred. The details of the glow discharge treatment are described in U.S. Pat. Nos. 3,462,335, 3,761,299, 4,072,769, and English Patent No. 891469. The method described in JP-A-59-556430 is also used, wherein a discharge atmospheric gas composition consists solely of a gas species generated in a vessel by subjecting a polyester support itself to a discharge treatment after the start of discharge. In addition, the method described in JP-B-60-16614 is also applicable, wherein the discharge treatment is conducted with maintaining the surface temperature of the film at 80° C. to 180° C. at the vacuum glow discharge treatment.

With regard to the degree of the surface treatment, a preferred range varies depending on the kind of the surface treatment. However, it is preferred to make a contact angle between the surface of the protective film subjected to the surface treatment and pure water less than 50° as a result of the surface treatment. The above contact angle is more preferably 25° to less than 45°. When the contact angle between the surface of the protective film and pure water falls within the above range, a good adhesion strength between the protective film and the polarizing film is achieved.

(Adhesive)

At the bonding of the polarizer composed of polyvinyl alcohol to the film of the invention subjected to the surface treatment, it is preferred to use an adhesive containing a water-soluble polymer. The water-soluble polymer to be preferably used as the above adhesive may include homopolymers and polymers each having ethylenically unsaturated monomer(s) as compositional element(s), such as N-vinylpyrrolidone, acrylic acid, methacrylic acid, maleic acid, β-hydroxyethyl acrylate, β-hydroxyethyl methacrylate, vinyl alcohol, methyl vinyl ketone, vinyl acetate, acrylamide, methacrylamide, diacetoneacrylamide, and vinylimidazole; and polyoxyethylene, polyoxypropylene, poly-2-methyloxazoline, methyl cellulose, hydroxyethyl cellulose, hydroxypropyl cellulose gelatin, and the like. In the invention, of these, PVA and gelatin are preferred. The thickness of the adhesive layer is preferably 0.01 to 5 µm, more preferably 0.05 to 3 µm after drying.

(Antireflection Layer)

The protective film disposed on the opposite side of the polarizing plate to the liquid crystal cell is preferably provided with functional film(s) such as an antireflection layer. Particularly, in the invention, there is preferably used at least an antireflection layer configured such that a light scattering layer and a low refractive index layer are stacked in this order on the protective film, or an antireflection layer configured such that an intermediate refractive index layer, a high refractive index layer, and a low refractive index layer are stacked in this order on the protective film.

(Light Scattering Layer)

The light scattering layer is formed for the purpose of imparting, to the film, light diffusibility due to surface scattering and/or internal scattering and a hard coat property for improving the scratch resistance of the film. Therefore, the layer is formed with incorporating a binder for imparting the hard coat property, mat particles for imparting the light diffusibility, and if required, inorganic fillers for achieving higher refractive index, prevention of crosslinking and shrinkage, and higher strength. The film thickness of the light scattering layer is preferably 1 to 10 µm, more preferably 1.2 to 6 µm from the viewpoints of imparting the hard coat property and suppressing curling and deterioration of brittleness.

(Other Layers of Antireflection Film)

Furthermore, a hard coat layer, a front scattering layer, a primer layer, an antistatic layer, an undercoat layer, a protective layer, or the like may be provided.

(Hard Coat Layer)

The hard coat layer is preferably provided on the surface of the support in order to impart physical strength to the protective film provided with the antireflection layer. Particularly, it is preferably provided between the support and the high refractive index layer. The hard coat layer is preferably formed by a crosslinking reaction of a light and/or heat curable compound or a polymerization reaction. The curable functional group in the curable compound is preferably a photopolymerizable functional group. Moreover, as hydrolyzable functional group-containing organometallic compounds, organic alkoxysilyl compounds are preferred.

(Antistatic Layer)

When an antistatic layer is provided, an electric conductivity of a volume resistivity of $10^{-8}$ ($\Omega cm^{-3}$) or less is preferably imparted thereto. The volume resistivity of $10^{-8}$ ($\Omega cm^{-3}$) can be imparted by the use of a hygroscopic substance, a water soluble inorganic salt, a certain kind of surfactant, a cation polymer, an anion polymer, colloidal silica, or the like. However, there arise problems that the temperature and humidity dependency is large and a sufficient electric conductivity cannot be ensured at low humidity. For this reason, a metal oxide is preferred as the conductive layer material.

[Liquid Crystal Display Device]

The film of the invention, the retardant film comprising the film, and the polarizing plate using the film can be employed for liquid crystal cells and liquid crystal display devices of various display modes. Various display modes such as TN (Twisted Nematic), IPS (In-Plane Switching), FLC (Ferroelectric Liquid Crystal), AFLC (Anti-ferroelectric Liquid Crystal), OCB (Optically Compensatory Bend), STN (Super Twisted Nematic), VA (Vertically Aligned), and HAN (Hybrid Aligned Nematic) modes have been proposed. Of these, they can be preferably used for the OCB mode or the VA mode.

EXAMPLES

The following will further specifically describe the invention with reference to Examples. The materials, amounts, ratios, contents of treatments, procedures of the treatments, and the like shown in the following Examples can be optionally changed so long as they deviate from the gist of the invention. Therefore, the invention is not limited to the following specific Examples.

[Norbornene-based Compound]

Among the raw materials of the norbornene polymer for use in the invention, norbornenedimethanol can be purchased from Aldrich Co., Ltd. The other norbornene-based compounds were produced as shown in the following Synthetic Examples Synthetic Example 1

Synthesis of Intermediate D-1

Into a 1 L three-neck flask fitted with a thermometer and a cooling tube were weighed 50.0 g (0.324 mol) of norbornenedimethanol (exo, exo) and 404 mL of pyridine, followed by thorough stirring with a stirrer at room temperature. Then, 135.8 g (0.712 mol) of p-toluenesulfonyl chloride dissolved in 210 mL of anhydrous THF beforehand was gradually added dropwise thereto under ice cooling with maintaining the reaction system at 0° C. or lower. After the dropwise addition was completed, the whole was warmed to room temperature and stirred for 4.5 hours. After the reaction was completed, it was quenched with 0.12N hydrochloric acid, the mixture was washed with 0.12N hydrochloric acid, a saturated aqueous sodium bicarbonate solution, and water each three times, and the resulting organic layer was dried over magnesium sulfate.

After magnesium sulfate was filtered off, the filtrate was concentrated on an evaporator and the concentrate was dried in vacuo at 80° C. for 6 hours to obtain 51.6 g of an intermediate D-1 (yield 34%).

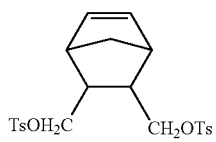

D-1

Synthetic Example 2

Synthesis of A-1 (Exo-form)

Into a 2 L three-neck flask fitted with a thermometer and a cooling tube were weighed 39.5 g (0.237 mol) of fluorene and 210 mL of anhydrous THF. The whole was stirred with a stirrer at room temperature and then cooled to −78° C. Subsequently, 297 mL (0.432 mol) of n-butyllithium (1.6 mol/L hexane solution) was gradually added dropwise thereto. After the dropwise addition was completed, the reaction system was stirred for 1 hour with maintaining the system at −78° C. Further, D-1 dissolved in anhydrous THF beforehand was gradually added dropwise. After the dropwise addition was completed, the whole was warmed to room temperature and stirred for another 3 hours at room temperature. After the reaction was completed, it was quenched with a saturated aqueous sodium chloride solution and washed with water three times, and the resulting organic layer was dried over magnesium sulfate. After magnesium sulfate was filtered off, the filtrate was concentrated on an evaporator to obtain a white solid. The white solid was recrystallized from methanol to obtain 13.7 g of an objective A-1 (exo-form) (yield 45%).

Synthetic Example 3

Synthesis of A-10 (Exo-form)

A-10 (exo-form) was obtained in an amount of 15.1 g by the same synthetic method except that 2,3-benzofluorene (manufactured by Aldrich Co., Ltd.) instead of fluorene was charged in an equimolar amount in Synthetic Example 2 (yield 42%).

Synthetic Example 4

Synthesis of A-11 (Exo-form)

A-11 (exo-form) was obtained in an amount of 17.8 g by the same synthetic method except that 2,7-dimethoxyfluorene (manufactured by Aldrich Co., Ltd.) instead of fluorene was charged in an equimolar amount in Synthetic Example 2 (yield 48%).

Synthetic Example 5

Synthesis of B-3

Into a 1 L autoclave were charged 231.4 g (1.75 mol) of dicyclopentadiene (manufactured by Wako Pure Chemical Industries, Ltd.), 420.5 g (4.2 mol) of allyl acetate (manufactured by Wako Pure Chemical Industries, Ltd.), and 1 g of hydroquinone (manufactured by Wako Pure Chemical Industries, Ltd.), and the space was replaced by nitrogen. The whole was stirred at an inner temperature of 180° C. for 9 hours in a closed system (rotation speed=300 rpm). The reaction mixture was filtered and volatile matters were evaporated. The residue was subjected to single distillation (pressure=10 mmHg, top temperature=86° C.) twice to obtain 358 g of an objective B-3 (yield 62%).

Synthetic Example 6

Synthesis of B-6

An objective B-6 was obtained in the same manner as in Synthetic Example 5 except that allyl acetate was changed to allyl caproate in Synthetic Example 5.

[Synthesis of Norbornene-Based Polymer]

Example 1

Synthesis of P-1

Into a 500 mL three-neck flask fitted with a thermometer, a cooling tube, and a stirring blade were weighed 58.2 g (0.350 mol) of B-3 synthesized in Synthetic Example 5 and 70 mL of toluene, followed by stirring at room temperature. Then, 21.3 mg (0.070 mmol) of bis(2,4-pentanedionato)palladium (manufactured by Tokyo Chemical Industry Co., Ltd.) and 19.6 mg (0.070 mmol) of tricyclohexylphosphine (manufactured by Strem Chemicals, Inc. Chemicals, Inc.) dissolved in 10 mL of toluene and 0.224 g (0.28 mmol) of dimethylanilinium tetrakispentafluorophenyl borate (manufactured by Strem Chemicals, Inc. Chemicals, Inc.) dissolved in 5 mL of methylene chloride were successively charged into the reaction vessel, heating was started, and the whole was stirred at 80° C. for 1 hour. During this time, toluene was suitably added as the viscosity of the reaction solution increased. After the reaction was completed, the reaction solution was diluted with toluene and the dilute was charged into an excess of methanol to precipitate a polymeric matter. The precipitate was filtered off and washed with a large amount of methanol. The resulting polymer was dried in vacuo at 110° C. for 6 hours to obtain 52.9 g of an objective polymer P-1 (yield 91%).

Example 2

Synthesis of P-2

An objective polymer P-2 was obtained in an amount of 92.6 g in the same manner as in Example 1 except that B-3 was changed to A-1 synthesized in Synthetic Example 2 (yield 93%).

Example 3

Synthesis of P-3

Into a 500 mL three-neck flask fitted with a thermometer, a cooling tube, and a stirring blade were weighed 57.0 g (0.343 mol) of B-3 synthesized in Synthetic Example 5 and 70 mL of toluene, followed by stirring at room temperature. Then, 21.3 mg (0.070 mmol) of bis(2,4-pentanedionato)palladium (manufactured by Tokyo Chemical Industry Co., Ltd.) and 19.6 mg (0.070 mmol) of tricyclohexylphosphine (manufactured by Strem Chemicals, Inc. Chemicals, Inc.) dissolved in 10 mL of toluene and 0.224 g (0.28 mmol) of dimethylanilinium tetrakispentafluorophenyl borate (manufactured by Strem Chemicals, Inc. Chemicals, Inc.) dissolved in 5 mL of methylene chloride were successively charged into the reaction vessel and heating was started. At the time when the reaction system was reached 80° C., 2.0 g (0.007 mol) of A-1 dissolved in 10 mL of toluene was charged thereinto and the whole was further stirred at 80° C. for 1 hour. During this time, toluene was suitably added as the viscosity of the reaction solution increased. After the reaction was completed, the reaction solution was diluted with toluene and the dilute was charged into an excess of methanol to precipitate a polymeric matter. The precipitate was filtered off and washed with a large amount of methanol. The resulting polymer was dried in vacuo at 110° C. for 6 hours to obtain 50.7 g of an objective polymer P-3 (yield 86%).

Example 4

Synthesis of P-4

Into a 500 mL three-neck flask fitted with a thermometer, a cooling tube, and a stirring blade were weighed 52.4 g (0.315 mol) of B-3 synthesized in Synthetic Example 5 and 60 mL of toluene, followed by stirring at room temperature. Then, 21.3 mg (0.070 mmol) of bis(2,4-pentanedionato)palladium (manufactured by Tokyo Chemical Industry Co., Ltd.) and 19.6 mg (0.070 mmol) of tricyclohexylphosphine (manufactured by Strem Chemicals, Inc.) dissolved in 10 mL of toluene and 0.224 g (0.28 mmol) of dimethylanilinium tetrakispentafluorophenyl borate (manufactured by Strem Chemicals, Inc.) dissolved in 5 mL of methylene chloride were successively charged into the reaction vessel and heating was started. At the time when the reaction system was reached 80° C., 10.0 g (0.035 mol) of A-1 dissolved in 20 mL of toluene was charged thereinto and the whole was further stirred at 80° C. for 1 hour. During this time, toluene was suitably added as the viscosity of the reaction solution increased. After the reaction was completed, the reaction solution was diluted with toluene and the dilute was charged into an excess of methanol to precipitate a polymeric matter. The precipitate was filtered off and washed with a large amount of methanol. The resulting polymer was dried in vacuo at 110° C. for 6 hours to obtain 53.0 g of an objective polymer P-4 (yield 85%).

Example 5

Synthesis of P-5

Into a 500 mL three-neck flask fitted with a thermometer, a cooling tube, and a stirring blade were weighed 40.7 g (0.245 mol) of B-3 synthesized in Synthetic Example 5, 29.9 g (0.105 mol) of A-1 synthesized in Synthetic Example 2, and 70 mL of toluene, followed by stirring at room temperature. Then, 21.3 mg (0.070 mmol) of bis(2,4-pentanedionato)palladium (manufactured by Tokyo Chemical Industry Co., Ltd.) and 19.6 mg (0.070 mmol) of tricyclohexylphosphine (manufactured by Strem Chemicals, Inc.) dissolved in 10 mL of toluene and 0.224 g (0.28 mmol) of dimethylanilinium tetrakispentafluorophenyl borate (manufactured by Strem Chemicals, Inc.) dissolved in 5 mL of methylene chloride were successively charged into the reaction vessel, heating was started, and the whole was further stirred at 80° C. for 1 hour. During this time, toluene was suitably added as the viscosity of the reaction solution increased. After the reaction was completed, the reaction solution was diluted with toluene and the dilute was charged into an excess of methanol to precipitate a polymeric matter. The precipitate was filtered off and washed with a large amount of methanol. The resulting polymer was dried in vacuo at 110° C. for 6 hours to obtain 61.4 g of an objective polymer P-5 (yield 87%).

Example 6

Synthesis of P-6

Into a 500 mL three-neck flask fitted with a thermometer, a cooling tube, and a stirring blade were weighed 55.0 g (0.245 mol) of B-6 synthesized in Synthetic Example 6, 29.9 g (0.105 mol) of A-1 synthesized in Synthetic Example 2, and 70 mL of toluene, followed by stirring at room temperature. Then, 21.3 mg (0.070 mmol) of bis(2,4-pentanedionato)palladium (manufactured by Tokyo Chemical Industry Co., Ltd.) and 19.6 mg (0.070 mmol) of tricyclohexylphosphine (manufactured by Strem Chemicals, Inc.) dissolved in 10 mL of toluene and 0.224 g (0.28 mmol) of dimethylanilinium tetrakispentafluorophenyl borate (manufactured by Strem Chemicals, Inc.) dissolved in 5 mL of methylene chloride were successively charged into the reaction vessel, heating was started, and the whole was further stirred at 80° C. for 4 hours. During this time, toluene was suitably added as the viscosity of the reaction solution increased. After the reaction was completed, the reaction solution was diluted with toluene and the dilute was charged into an excess of methanol to precipitate a polymeric matter. The precipitate was filtered off and washed with a large amount of methanol. The resulting polymer was dried in vacuo at 110° C. for 6 hours to obtain 67.0 g of an objective polymer P-6 (yield 79%).

Example 7

Synthesis of P-7

Into a 500 mL three-neck flask fitted with a thermometer, a cooling tube, and a stirring blade were weighed 52.4 g (0.315 mol) of B-3 synthesized in Synthetic Example 5 and 60 mL of toluene, followed by stirring at room temperature. Then, 21.3 mg (0.070 mmol) of bis(2,4-pentanedionato)palladium (manufactured by Tokyo Chemical Industry Co., Ltd.) and 19.6 mg (0.070 mmol) of tricyclohexylphosphine (manufactured by Strem Chemicals, Inc.) dissolved in 10 mL of toluene and 0.224 g (0.28 mmol) of dimethylanilinium tetrakispentafluorophenyl borate (manufactured by Strem Chemicals, Inc.) dissolved in 5 mL of methylene chloride were successively charged into the reaction vessel and heating was started. At the time when the reaction system was reached 80° C., 11.7 g (0.035 mol) of A-10 dissolved in 30 mL of toluene was charged thereinto and the whole was further stirred at 80° C. for 2 hours. During this time, toluene was suitably added as the viscosity of the reaction solution increased. After the reaction was completed, the reaction solution was diluted with toluene and the dilute was charged into an excess of methanol to precipitate a polymeric matter. The precipitate was filtered off and washed with a large amount of methanol. The resulting polymer was dried in vacuo at 110° C. for 6 hours to obtain 51.9 g of an objective polymer P-7 (yield 81%).

Example 8

Synthesis of P-8

Into a 500 mL three-neck flask fitted with a thermometer, a cooling tube, and a stirring blade were weighed 52.4 g (0.315 mol) of B-3 synthesized in Synthetic Example 5 and 60 mL of toluene, followed by stirring at room temperature. Then, 21.3 mg (0.070 mmol) of bis(2,4-pentanedionato)palladium (manufactured by Tokyo Chemical Industry Co., Ltd.) and 19.6 mg (0.070 mmol) of tricyclohexylphosphine (manufactured by Strem Chemicals, Inc.) dissolved in 10 mL of toluene and 0.224 g (0.28 mmol) of dimethylanilinium tetrakispentafluorophenyl borate (manufactured by Strem Chemicals, Inc.) dissolved in 5 mL of methylene chloride were successively charged into the reaction vessel and heating was started. At the time when the reaction system was reached 80° C., 12.1 g (0.035 mol) of A-11 dissolved in 30 mL of toluene was charged thereinto and the whole was further stirred at 80° C. for 2 hours. During this time, toluene was suitably added as the viscosity of the reaction solution increased. After the reaction was completed, the reaction solution was diluted with toluene and the dilute was charged into an excess of methanol to precipitate a polymeric matter. The precipitate was filtered off and washed with a large amount of methanol. The resulting polymer was dried in vacuo at 110° C. for 6 hours to obtain 52.8 g of an objective polymer P-8 (yield 82%).

Synthetic Example 2

Synthesis of Comparative Example O-9

According to the method described in JP-A-2005-36201, a ring-opened copolymer O-9 of A-1 and B-3 can be synthesized.

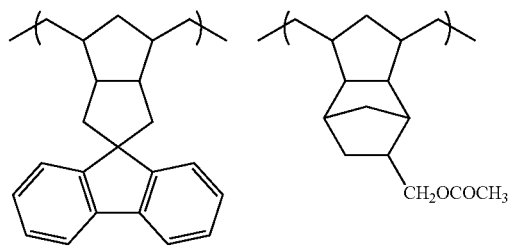

O-1

[Evaluation of Physical Properties of Norbornene-based Polymers]

The norbornene-based polymer of the invention was dissolved in tetrahydrofuran and was subjected to measurement of molecular weight on a gel permeation chromatograph. The results are shown in Table 1.

Moreover, the compositional ratio of the norbornene-based copolymer of the invention was calculated from the results of $^1$H-NMR measurement. Namely, when the copolymer is dissolved in deuterated chloroform and measured on $^1$H-NMR, the following relations are established when a molar content of a monomer A is expressed by x and a molar content of a monomer B is expressed by y, wherein an integral value of peaks appearing at 6.5 to 8.5 ppm (derived from aromatic groups) is expressed by A and an integral value of peaks appearing at 0.5 to 5.0 ppm (derived from aliphatic groups) is expressed by B.

(In Cases of P-3 to P-5)

$8x=A$ and $12x+14y=B$ (In Case of P-6)

$8x=A$ and $12x+22y=B$ (In Case of P-7)

$10x=A$ and $12x+14y=B$ (In Case of P-8)

$6x=A$ and $18x+14y=B$

According to them, each value of x and y is determined and the compositional ratio converted into percentage is shown in Table 1.

TABLE 1

| | Polymer | Monomer A | Monomer B | Compositional ratio (A/B) | Mw | Mn |
|---|---|---|---|---|---|---|
| Comparative Example | P-1 | — | B-3 | 0/100 | 278,000 | 81,000 |
| Inventive one | P-2 | A-1 | — | 100/0 | 724,000 | 181,000 |
| Inventive one | P-3 | A-1 | B-3 | 2/98 | 349,000 | 102,000 |
| Inventive one | P-4 | A-1 | B-3 | 10/90 | 299,000 | 90,000 |
| Inventive one | P-5 | A-1 | B-3 | 30/70 | 283,000 | 70,000 |
| Inventive one | P-6 | A-1 | B-6 | 30/70 | 310,000 | 101,000 |
| Inventive one | P-7 | A-10 | B-3 | 10/90 | 290,000 | 100,000 |
| Inventive one | P-8 | A-11 | B-3 | 10/90 | 281,000 | 98,000 |
| Comparative Example | O-1 | A-1 | B-3 | 30/70 | 280,000 | 69,000 |

Example 9

Preparation of Polymer Films and Measurement of Film Physical Properties (Film Formation)

Fifty grams of the polymer P-1 obtained in the above was dissolved in 200 g of methylene chloride and the whole was subjected to pressure filtration. The resulting dope was cast on a hydrophobic glass plate having a size A3 using an applicator to form a film. The film was dried at 25° C. for 5 minutes in a closed system and successively dried for 10 minutes in an air-blowing dryer at 40° C. The film was released from the glass plate and was held with a stainless frame and the whole was dried for 30 minutes in a dryer at 100° C. and for 30 minutes in a dryer at 133° C. to obtain a transparent film F-1. Similarly, P-2 to P-8 and 0-1 were subjected to film formation to obtain transparent films F-2 to F-9.

(Stretching)

Each of F-1 and F-3 to F-9 were cut into strips having a length of 5 cm and a width of 5 cm. Each strip was stretched by 10% at a temperature of 230° C. to 280° C. using an automatic biaxial stretching machine manufactured by Imoto Seisakusho to obtain stretched films F'-1 and F'-3 to F'-9.

(Measurement of Physical Properties)

Re and Rth of an unstretched or stretched film at a wavelength of 589 nm were measured as mentioned above. The thickness of the film was measured at any three points by means of a digital micrometer and an average value thereof was obtained.

The evaluation results of the films F-1 to F-9 and F'-1 and F'-3 to F'-9 prepared in the above are summarized in Table 2.

TABLE 2

|  | Film | Re [nm] | Rth [nm] |
|---|---|---|---|
| Comparative Example | F-1 | 10 | 200 |
| Inventive one | F-2 | −10 | −1800 |
| Inventive one | F-3 | 1 | 20 |
| Inventive one | F-4 | 0 | −100 |
| Inventive one | F-5 | −1 | −410 |
| Inventive one | F-6 | −1 | −390 |
| Inventive one | F-7 | 0 | −120 |
| Inventive one | F-8 | 0 | −110 |
| Comparative Example | F-9 | 3 | 50 |
| Comparative Example | F'-1 | 25 | 240 |
| Inventive one | F'-3 | 2 | 10 |
| Inventive one | F'-4 | 1 | −120 |
| Inventive one | F'-5 | 1 | −480 |
| Inventive one | F'-6 | 2 | −470 |
| Inventive one | F'-7 | −1 | −150 |
| Inventive one | F'-8 | −1 | −135 |
| Comparative Example | F'-9 | −20 | 4 |

As apparent from the results in Table 2, the films of the invention have a very small Rth or a negative Rth. Particularly, they have a characteristic that a negative Rth is exhibited when the compositional ratio of the monomer A is 10% by mol or more. Furthermore, as apparent from the results of F-2 to F-6, the value of Rth can be regulated by controlling the compositional ratio of the norbornene-based copolymer of the invention and the copolymer is excellent in negative birefringence-exhibiting ability as compared with the ring-opened copolymer F-9 which is Comparative Example.

Moreover, the films of the invention have a characteristic that stretching dependency of Re is small and only Rth can be efficiently exhibited by stretching. Both of Re and Rth exhibit negative birefringence along with stretching in the case of the ring-opened copolymer F-9 which is Comparative Example but it is apparent that only Rth can be efficiently regulated with little influence of stretching on Re in the addition copolymers F'-3 to F'-8 of the invention. The behavior is characteristic to the addition copolymers of the invention, also as apparent from the fact that both of Re and Rth exhibit positive birefringence when F'-1 composed of the co-monomer B (B-3) alone is stretched.

Example 10

Preparation of Polarizing Plate and Evaluation

The film F-4 prepared in the above and a cellulose acylate film (Fuji TAC manufactured by Fuji Photo Film Co., Ltd.) were immersed in a 1.5N aqueous sodium hydroxide solution at 60° C. for 2 minutes. Thereafter, they were immersed in a 0.1N aqueous sulfuric acid solution for 30 seconds and then passed through a water-washing bath to obtain saponified F-4 and Fuji TAC.

According to Example 1 in JP-A-2001-141926, a polyvinyl alcohol film (9X75RS manufactured by Kuraray Co., Ltd.) having a thickness of 75 μm was stretched in a longitudinal direction by imparting peripheral velocity difference between two pairs of nip rolls to obtain a polarizing film.

The polarizing plate thus obtained and the saponified F-4 were bonded using a 3% aqueous solution of polyvinyl alcohol (PVA) (PVA-117H manufactured by Kuraray Co., Ltd.) so as to make the angle between longitudinal directions of the films 45° in a layer composition of "saponified F-4/polarizing film/saponified Fuji TAC" to prepare a polarizing plate Pol-1.

Example 11

Manufacture of Liquid Display Device and Evaluation

Of two pairs of polarizing plates which are placed on both sides of a liquid crystal layer in each of 26-inch and 40-inch liquid crystal display devices (manufactured by Sharp Corporation) using VA type liquid crystal cells, the polarizing plate at one side on the observer side was released and the above polarizing plate Pol-1 was bonded with an adhesive thereto instead. Liquid crystal display devices were manufactured by placing the Pol-1 so that the transmission axis of the polarizing plate on the observer side was orthogonal to the transmission axis of the polarizing plate on the backlight side. The resulting liquid crystal display devices were observed in view of color unevenness. The liquid crystal display devices in which the polarizing plate Pol-1 of the invention was mounted were of very excellence without color unevenness.

As a result of extensive studies for solving the above problems, the present inventors have found that a film of a norbornene-based polymer obtained by addition polymerization of a composition of a specific norbornene derivative having a spiro bond exhibits very small Rth or negative Rth. Moreover, they have found that a film of a norbornene-based copolymer obtained by addition polymerization of a norbornene derivative having appropriate positive birefringence and a specific norbornene derivative having a spiro bond can regulate the value of Rth through changing the compositional ratio thereof and furthermore exhibits very small Rth or negative Rth though monoaxial stretching with hardly affecting Re. Thus, they have accomplished the invention. The incorporation of the norbornene-based polymer film of the invention affords a polarizing plate and a liquid crystal display device, both possessing a high quality.

The entire disclosure of each and every foreign patent application from which the benefit of foreign priority has been claimed in the present application is incorporated herein by reference, as if fully set forth.

What is claimed is:

1. A norbornene-based polymer, which is formed by addition polymerization of a composition comprising at least one norbornene derivative represented by formula (1):

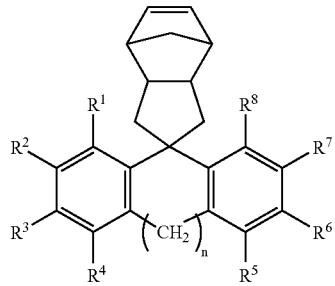

Formula (1)

wherein $R^1$, $R^2$, $R^3$, $R^4$, $R^5$, $R^6$, $R^7$ and $R^8$ each independently represents a hydrogen atom or a substituent; and n represents an integer of 0 to 2.

2. The norbornene-based polymer according to claim 1, wherein the composition further comprises at least one norbornene derivative represented by formula (2):

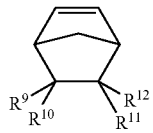

Formula (2)

wherein $R^9$, $R^{10}$, $R^{11}$ and $R^{12}$ each independently represents a hydrogen atom or a substituent.

3. The norbornene-based polymer according to claim 2, wherein at least one of $R^9$, $R^{10}$, $R^{11}$ and $R^{12}$ in formula (2) is a substituent represented by formula (3):

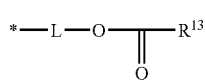

Formula (3)

wherein $R^{13}$ represents a substituted or unsubstituted aliphatic group; and

L represents a single bond or an unsubstituted aliphatic group.

4. The norbornene-based polymer according to claim 1, wherein n represents an integer of 0 to 1.

5. The norbornene-based polymer according to claim 4, wherein n represents 0.

6. The norbornene-based polymer according to claim 3, wherein $R^{13}$ represents an unsubstituted aliphatic group.

7. The norbornene-based polymer according to claim 3, wherein L represents an unsubstituted aliphatic group.

8. A film, which comprises the norbornene-based polymer according to claim 1.

9. A polarizing plate, which comprises the film according to claim 8.

10. A liquid crystal display device, which comprises at least one of the film according to claim 8 and a polarizing plate comprising the film according to claim 8.

* * * * *